(12) United States Patent
Otto et al.

(10) Patent No.: US 8,063,122 B2
(45) Date of Patent: Nov. 22, 2011

(54) MIXTURE, POLYESTER COMPOSITION, FILM AND PROCEDURES FOR THEIR MANUFACTURE

(75) Inventors: Brigitta Otto, Mitlow (DE); Karl-Heinz Heldmann, Raunheim (DE); Eckhard Seidel, Frankfurt (DE)

(73) Assignee: Lurgi Zimmer GmbH, Frankfurt am Main (DE)

( * ) Notice: Subject to any disclaimer, the term of this patent is extended or adjusted under 35 U.S.C. 154(b) by 719 days.

(21) Appl. No.: 11/204,625

(22) Filed: Aug. 16, 2005

(65) Prior Publication Data

US 2006/0069184 A1    Mar. 30, 2006

(30) Foreign Application Priority Data

Sep. 24, 2004  (DE) .................. 10 2004 046 771

(51) Int. Cl.
*C08G 18/77* (2006.01)
(52) U.S. Cl. .................. 524/115; 528/272; 528/271
(58) Field of Classification Search .................. 528/274; 502/150, 162; 524/115
See application file for complete search history.

(56) References Cited

U.S. PATENT DOCUMENTS

| | | | |
|---|---|---|---|
| 3,169,944 A | | 2/1965 | Scott et al. |
| 4,013,624 A | * | 3/1977 | Hoeschele .................. 528/300 |
| 4,086,208 A | | 4/1978 | Murayama et al. |
| 4,254,018 A | | 3/1981 | Kowallik et al. |
| 4,576,344 A | * | 3/1986 | Sasaki et al. .................. 242/547 |
| 5,748,872 A | * | 5/1998 | Norman .................. 714/11 |
| 6,160,085 A | * | 12/2000 | Fujimori et al. .................. 528/272 |
| 6,787,630 B1 | | 9/2004 | Dominguez de Walter et al. |
| 6,967,235 B2 | * | 11/2005 | Seidel et al. .................. 528/279 |
| 7,208,565 B1 | * | 4/2007 | Nakajima et al. .................. 528/282 |
| 2002/0004578 A1 | * | 1/2002 | Shelby et al. .................. 528/176 |
| 2002/0028862 A1 | | 3/2002 | Johnson et al. |
| 2003/0018160 A1 | * | 1/2003 | Otto et al. .................. 528/274 |
| 2003/0144459 A1 | * | 7/2003 | Fujimori et al. .................. 528/275 |
| 2004/0242838 A1 | * | 12/2004 | Duan .................. 528/293 |
| 2005/0043565 A1 | | 2/2005 | Przewonsy |
| 2005/0239929 A1 | * | 10/2005 | Sakamoto et al. .................. 524/115 |

FOREIGN PATENT DOCUMENTS

| | | | |
|---|---|---|---|
| DE | 1 520 079 | | 2/1970 |
| DE | 26 00 701 A1 | | 7/1976 |
| DE | 27 08 790 A1 | | 9/1978 |
| EP | 0 699 700 A2 | | 3/1996 |
| EP | 1213123 | | 6/2002 |
| EP | 1213123 A1 | * | 6/2002 |
| JP | 60-35020 | * | 2/1985 |
| JP | 2004067924 | | 3/2004 |
| WO | WO 01/14448 | * | 3/2001 |
| WO | WO 02/098947 | * | 12/2002 |
| WO | WO 2004/031258 | * | 4/2004 |

OTHER PUBLICATIONS

Ichikawa, Derwent abstract of JP 60-35020, Apr. 1985.*
Allcock, H. et al, Contemporary Polymer Chemisty, Third Edition, 2003, pp. 34-35.*
Human translation of JP 60-35020.*
International Search Report from PCT/EP2005/008048 mailed Mar. 3, 2006.

* cited by examiner

*Primary Examiner* — Vasu Jagannathan
*Assistant Examiner* — Doris Lee
(74) *Attorney, Agent, or Firm* — McDonnell Boehnen Hulbert & Berghoff LLP

(57) ABSTRACT

The present invention relates to mixtures comprising at least one polyester precursor and at least one alkali- and/or alkaline-earth metal salt where the mixture contains at least one phosphonic acid ester of the Formula (I)

$$(RO)OC—R'—PO(OR)_2 \quad (I)$$

where independently R represents a group with 1 to 60 carbon atoms and R' represents a group with 1 to 20 carbon atoms. Furthermore, the present invention relates to the polyester compositions which can be produced from the mixtures and to the resulting polyester films.

15 Claims, No Drawings

MIXTURE, POLYESTER COMPOSITION, FILM AND PROCEDURES FOR THEIR MANUFACTURE

BACKGROUND OF THE INVENTION

1. Field of the Invention

The present invention relates to mixtures, polyester compositions, films and procedures for their manufacture.

2. Description of Related Art

Aromatic polyesters such as, for example, polyethyleneterephthalate are synthetic materials widely known in the plastics industry which are used, amongst other applications, for the manufacture of films. The economic importance of these synthetic materials requires the use of the most cost-beneficial procedure possible for their preparation. In order to increase the speed of manufacture of the films a procedure is often used which involves the polyester melt carrying an electrostatic charge. This requires that the polyester melt possesses the lowest possible level of specific resistance to achieve a high product quality. This is often achieved by adding metal salts to the melt. For example, EP 1 213 123 describes the influence of different metallic salts upon the product quality of extruded films.

These polyester films have the disadvantage that the synthetic material suffers from low stability. To improve this level of stability phosphorus compounds are most frequently employed. If conventional phosphoric acid derivatives are used, turbidity develops which is disadvantageous for the optical appearance of the films.

Polyesters are known from EP 0 403 664 which contain phosphonium compounds in addition to alkali- and alkaline-earth metal salts. These films exhibit a high degree of transparency. Furthermore, these films possess high thermal stability and they can be produced at a high speed when manufactured by the above-mentioned procedure. There is, however, a disadvantage in that phosphonium compounds are often injurious to health and are able to migrate out of the film. Furthermore, phosphonium compounds are very expensive.

Generally speaking, it is necessary that all the phosphorus compounds used for the application in question be granted FDA—(Food and Drugs Administration) approval.

Beyond this, the publication "Improved Electrostatic Pinning Using a Biased, Conductive Shield" by M C Zaretsky, J E Benson, in the Journal of Electrostatics, 40 & 41 (1997) 735-740) describes the extrusion characteristics of compositions which in addition to metal salts also contain the phosphorus compounds described in the document EP 0 403 664.

BRIEF SUMMARY OF THE INVENTION

Taking account of the present state of the technology it was the object of the present invention to make available a polyester composition by means of which the production of films at a particularly high speed is possible whereby the resulting films should exhibit a high level of thermal stability accompanied by a high degree of transparency.

At the same time it should be possible for the polyester composition to be produced at a particularly favourable cost. Furthermore, it should be possible for the polyester composition to be converted to polyester films on known types of plant. A further requirement was that the films should, if possible, not contain any compounds having an adverse influence upon health.

It was also an object of the present invention that it should be able to produce films with outstanding mechanical properties and that these films should contain a very low proportion of low-molecular weight impurities.

Yet another requirement was that the films should carry a low level of electrostatic charge.

In addition, the films should exhibit a high level of durability. In particular, there should be the least possible opportunity for changes to develop as a result of migration of the constituents of the films.

Furthermore, it should be possible for the resulting films to be re-cycled without any difficulty.

A decisive step for the resolving of these objectives and of others—which are not referred to specifically but which can be directly derived or inferred from the inter-related matters introduced and discussed herein—was taken by making available a polyester composition, a method of making a polyester composition, and a film formed from the composition, all as described herein below.

Owing to the fact that a mixture comprises at least one polyester precursor, at least one alkali- and/or alkaline-earth metal salt, at least one phosphonic acid ester of the Formula (1)

$$(RO)OC-R'-PO(OR)_2 \qquad (1)$$

where independently R represents a group with 1 to 60 carbon atoms and R' represents a binding group having 1 to 20 carbon atoms it is possible in a manner which is not necessarily predictable to make available a polyester composition which can be used for the manufacture of polyester films with high levels of heat resistance and of transparency and in such a manner that the films can be produced at high speed and at low cost.

At the same time, a number of other advantages are obtained. These include, amongst other items:

The polyester compositions of the present invention can be processed into films on a large scale and at low cost by the use of known items of plant.

Furthermore, the films in accordance with the invention can be produced on a large scale with a particularly low proportion of waste relative to the running speed of the machine.

In addition, the films obtained in accordance with the invention carry a low level of electrostatic charge, a feature which is advantageous or necessary for many applications.

The films in accordance with the invention are characterised by a very low level of turbidity. Furthermore, the polyester compositions in accordance with the invention can be processed into particularly thin films while maintaining a very low level of waste.

Beyond that, the films obtained in accordance with the invention exhibit a very low content of impurities and they can be re-cycled with ease.

Furthermore, the polyester compositions in accordance with the invention and the films made with them contain no material which is objectionable on health grounds.

DETAILED DESCRIPTION OF THE INVENTION

The films in accordance with the invention involve the use of at least one aromatic pre-cursor. In this context, the term 'polyester precursor' is capable of wide interpretation. In addition to compositions where at least one free aromatic dicarboxylic acid or at least one aromatic dicarboxylic acid ester is reacted with at least one suitable alkanediol, the term also embraces other precursor polymers with a low molecular weight of 500 to 10,000 g/mol or polyesters with a molecular weight of more than 10,000 g/mol which can be condensed to a higher molecular weight, the molecular weight indication referring to the weighted-mean values.

The known aromatic dicarboxylic acids include terephthalic acid, isophthalic acid and 2,6-naphthalene dicarboxylic acid. The customary alkanediols include, amongst others, ethyleneglycol, 1,3-propanediol, 1,4-butanediol and/or 1,4-cyclohexanediol.

The aromatic polyesters which can be obtained from the polyester precursors are well known in the industry. These include, amongst others, polyethylene terephthalate, polytrimethylene terephthalate, polybutylene terephthalate and/or polyethylene naphthalate with a preference for polyethylene terephthalate and polytrimethylene terephthalate.

In addition to homopolymers of the previously described polyesters it is also possible to use co-polymers whereby mixtures of the previously described dicarboxylic acids may be used here. Furthermore, these co-polymers may embrace other dicarboxylic acids or hydroxy carboxylic acids such as, for example, 1,4-cyclohexanedicarboxylic acid, adipic acid and p-hydroxybenzoic acid.

The proportion of the polyester precursor in the mixture amounts, preferably, to at least 70, more preferably to at least 80 and with a special preference for a minimum of 90% by weight by reference to the total weight of the mixture.

Furthermore, the mixture contains at least one alkali- and/or alkaline-earth metal salt. These compounds are widely known. Amongst the alkali metals there is a preference for lithium, sodium and potassium and for lithium in particular. The preferred alkaline-earth metals include magnesium and calcium and there is a preference for the use of alkaline-earth metals compared with alkali metals.

In accordance with a special aspect of the present invention alkali- and alkaline-earth metal salts are used which are soluble in water. At a temperature of 25° C. the solubility amounts to preferably at least 1 g/liter, and particularly preferably a minimum of 5 g/liter. These salts are widely known whereby the carboxylic acid salts and hydroxides and, if appropriate, halogenides of the previously-mentioned metals can be used.

The specially preferred compounds include magnesium acetate tetrahydrate, calcium acetate hydrate, sodium acetate trihydrate, magnesium oxide, magnesium chloride hexahydrate, sodium chloride, potassium acetate, sodium decahydrate, sodium hydrogen phosphate monohydrate, lithium citrate tetrahydrate, lithium hydroxide, calcium chloride, calcium hydride dihydrate (tetrahydrate), potassium chloride, barium acetate monohydrate.

The previously described alkali- and alkaline-earth metal salts can be used individually or as mixtures.

The alkali- and alkaline-earth metal salts can, in particular, be used as a clear solution, whereby these solutions preferably exhibit a turbidity equal to 8 or less as determined as "nephelometric turbidity units" (NTU). In order to obtain clear solutions these salts can be dissolved, in particular, in water after which they are mixed with other solvents and in particular with organic solvents such as, for example, ethyleneglycol.

Preferably the proportion of the alkali- and/or alkaline-earth metal salts amounts to 1-1,000 ppm, with particular preference for 5-500 ppm, by reference to the weight of the polyester precursor.

Furthermore the mixture for the preparation of a polyester composition comprises at least one phosphonic acid ester of the Formula (1)

$$(RO)OC-R'-PO(OR)_2 \quad (1)$$

where independently R represents a group with 1 to 60 carbon atoms and R' represents a binding group having 1 to 20 carbon atoms.

The term "group with 1-60 carbon atoms" or "group with 1-20 carbon atoms" relates to the residues of organic compounds having 1-60 or 1-20 carbon atoms. It embraces aromatic, heteroaromatic, aliphatic and heteroaliphatic groups. The heteroaromatic or heteroaliphatic groups may contain, in particular, oxygen-, nitrogen-, sulphur- and phosphorus atoms in addition to carbon- and hydrogen atoms. The named groups may be branched or non-branched or cyclic.

The preferred group R includes cyclo-alkyl-, alkyl- or aryl groups with 1 to 20 carbon atoms with a special preference for alkyl groups. The preferred aryl groups include, in particular, phenyl residues, benzyl residues and naphthyl residues. The particularly preferred alkyl groups include, amongst others, methyl-, ethyl-, propyl- and butyl residues. The cyclo-alkyl group includes, in particular, the cyclo-hexyl group. In this context special preference is given to methyl-, ethyl, propyl- and butyl residues.

Preferably group R in Formula (I) represents a cyclo-alkylene-, alkylene- or aryl group with 1-8 carbon atoms with a special preference for 1-6 carbon atoms. These include, in particular, cyclo-hexylene- and phenylene groups together with methylene-, ethylene, propylene- and butylene groups, with alkylene groups being preferred to aryl groups. Preferably the group R' in Formula I represents a methylene or ethylene group.

The specially preferred phosphonic acid esters having the Formula (I) include, amongst others tri-methylphosphono acetate, tri-ethylphosphono acetate (TEPA), tri-propylphosphono acetate, tri-butylphosphono acetate, tri-ethylphosphono propionate (TEPP), tri-methyl phosphono proprionate, tri-propylphosphono proprionate and tri-butylphosphono proprionate.

Preferably, the phosphonic acid ester corresponding to Formula (I) is used at the rate of between 2 and 1,000 ppm, preferably between 10 and 500 ppm, with respect to the weight of the polyester precursor.

In accordance with a particular aspect of the present invention the phosphonic acid ester in accordance with Formula (I) can be added as a solution to the polyester precursor. Preferably these solutions contain between 0.1 and 20% by weight, with a special preference for between 1 and 15% by weight and, in particular, for between 2 and 8% by weight of the phosphonic acid ester in accordance with Formula (I) with respect to the weight of the solution. The preferred solvents include, in particular, organic solvents with a special preference for ethylene glycol.

Special preference is given to a molar ratio between the alkali- and/or alkaline-earth metal salts and the phosphonic acid ester of between 1:0.1 and 1:2.0 and, more preferably, between 1:0.5 and 1:1.5.

Surprisingly it is possible for heat-stable, clear solutions to be obtained if alkali- and/or alkaline-earth metal salts are dissolved in water after which at least one organic solvent is added and then the whole being added to at least one mixture which contains at least one phosphonic acid ester of the Formula (I)

$$(RO)OC-R'-PO(OR)_2 \quad (I)$$

where independently R represents a group having 1 to 60 carbon atoms and R' a binding group with 1 to 20 carbon atoms—and at least one organic solvent.

Such solutions represent useful intermediate products which are equally an object of the present invention since the mixtures containing at least one polyester precursor are preferably prepared from such solutions. In particular, these solutions exhibit a high degree of stability when exposed to heating.

The stability of these solutions is particularly surprising because solutions of alkaline-earth salts which include water and ethylene glycol can become turbid when heated under reflux. Thus, for example, an aqueous solution of magnesium acetate after being diluted with ethylene glycol to produce a solution containing 10% by weight of magnesium acetate becomes turbid if boiled under reflux.

Preferably, the alkali- and/or alkaline-earth metal salts are first dissolved in water after which an organic solvent is added. In this situation preference is given to a weight ratio between alkali- and/or alkaline-earth metal salt and water of between 2:1 and 1:10 with a particular preference for a ratio between 1:1 and 1:4.

Finally this solution is added to at least one organic solvent in such a proportion that the solution contains at least 50%—and preferably a minimum of 60%—by weight of organic solvent with respect to the total weight of the solution. The proportion of alkali- and/or alkaline-earth metal salt in this solution amounts to, preferably, at least 1% by weight and, in particular, to a minimum of 8% by weight with respect to the total weight of the solution.

If the solution of alkaline-earth salts which is clear at room temperature and contains both water and at least one organic solvent is mixed at room temperature with mixtures of organic solvents and phosphonic acid derivatives in accordance with Formula (I) there are obtained, surprisingly, clear and stable solutions with phosphonic acid esters—which remain stable even under reflux conditions. When film formation takes place the resulting films have the properties which are desired during manufacture and in the end product.

Preferably, solutions of organic solvents and phosphonic acid derivatives in accordance with Formula (I) contain at least 50%—and more preferably a minimum of 60% by weight of organic solvent and, preferably, at least 1%—and more preferably—at least 8% by weight of phosphonic acid derivatives in accordance with Formula (I)—in each case with respect to the total weight of the solution.

Preferably, solutions of organic solvents, water alkali- and/or alkaline-earth metal salts and phosphonic acid derivatives in accordance with Formula (I) contain at least 0.5%—and more preferably—at least 3% by weight of water; at least 0.5%—and more preferably at least 3% by weight of alkali- and/or alkaline-earth metal salts; at least 0.5%—and more preferably—at least 3% by weight of phosphonic acid derivatives in accordance with Formula (I)—and at least 50%—and more preferably—60% by weight of organic solvent.

Special preference is given to the use of ethylene glycol as the organic solvent or to a compound which can release ethylene glycol.

In addition to the previously described constituents, the mixture to be used for the preparation of polyester compositions may contain branching agents. The preferred branching agents used in accordance with the invention include, amongst others, acids or their derivatives with at least three functional groups such as tri-mellitic acid, pyro-mellitic acid or tri-bis-hexavalent alcohols such as tri-methylolpropane, penta-aerythritol, di-penta-aerythritol, glycerine or corresponding hydroxy acids. The particularly preferred branching agent is penta-aerythritol.

The mixture may contain, preferably, 1 to 300 ppm but more preferably 50 to 250 ppm of branching agent with respect to the total weight of the polyester precursor.

The mixture in accordance with the invention may contain customary amounts—preferably 0 to 5% by weight, preferably 0 to 1% by weight, with respect to the total weight of the mixture—of other additives such as catalysts, stabilisers, anti-static agents, flame-retardants, dyestuffs, dyestuff-reception modifiers, light stabilisers, organic phosphites, optical brighteners, fillers and matting agents and, in particular, silicon dioxide, aluminium oxide and alum earth.

The mixture in accordance with the invention can be used, in particular, for the preparation of polyester compositions. This involves converting a mixture whereby at least one phosphonic acid ester of the Formula (I) reacts with the polyester precursor. It is assumed that in this situation covalent bonds are formed in such a way that the resulting polyester may include groups of formula (II), (III) and/or (IV)

$$Z—O—C(O)—R'—PO(OR)_2 \tag{II}$$

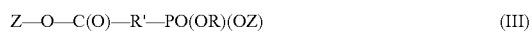
$$Z—O—C(O)—R'—PO(OR)(OZ) \tag{III}$$

$$Z—O—C(O)—R'—PO(OZ)_2 \tag{IV}$$

wherein Z is a polyester residue, R' is a bonding group with 1 to 20 carbon atoms and R is independently a group with 1 to 60 carbon atoms or a hydrogen atom, without this description being of a limiting nature. Here the polyester residue is a group which can be obtained by condensation of the polyester precursor.

The preparation of the polyester composition can proceed by using any of the known procedures. The preparation of the polyester can take place either continuously or batch-wise by reacting a diol with di-ester such as, for example, dimethyl-terephthalate or with terephthalic acid. In this context preference is given to the use of the acid, e.g. terephthalic acid. The immediate product is the dicarboxylic acid ester which when subjected to increasing temperature under reduced pressure is polycondensed in one or more stages, releasing diol and water.

In general, catalysts are employed for this reaction such as, for example, Ti, Mn, Mg, Ca, Li, Co and/or Zn for the inter-esterification step; for example, compounds of Sb, Ti, Ge and/or Sn for the esterification and, for example, compounds of Sb, Ti, Pb, Ge, Zn and/or Sn or zeolites for the polycondensation. In this context, the catalysts are used in the normal quantities of, for example, up to 500 ppm with respect to the polyester precursor.

The additives and, in particular, the alkali- and/or the alkaline-earth metal salt together with the phosphonic acid ester can be added at the beginning of the polycondensation reaction. The additives can also be added to the reaction mixture at a later stage. The additives can be fed in either separately or all at the same time.

In accordance with a preferred embodiment of the present invention the phosphonic acid ester is added only when at least 50% and, in particular, 70% of the esterification mixture has been esterified. Particular preference is given to a degree of esterification in the range between 80 and 99% with particular preference given to between 92 and 98%. This degree of esterification (U) can be calculated from the saponification number ($V_z$) and the acid number ($S_z$) of the reaction mixture by using the equation $U=(V_z-S_z)*100/V_z$. The saponification number is determined by saponification with potassium hydroxide in n-propanol/ethyleneglycol (8:2) and potentiometric titration while the acid number is determined by potentiometric titration in dimethylformamide.

Further details for the preparation of the polyester composition are to be found in, amongst other sources, the Encyclopedia of Polymer Science and Engineering Vol. 12, 2nd Edition, Pages 195-210, EP 0 921 145, U.S. Pat. No. 4,113,704 and DE-OS 198 41 375.

In general, the polyester in the composition can exhibit an intrinsic viscosity in the range between 0.5 and 0.8, preferably between 0.56 and 0.70 dL/g, measured in phenol/dichlorobenzene (6:4) at 25° C. (125 mg of polyester in 25 ml of solution).

The metal-related proportion of alkali- and alkaline-earth metals in the polyester composition with respect to the weight of the composition lies, preferably, between 5 and 1,000 ppm, with a special preference for between 10 and 500 ppm.

The atomic proportion of phosphorus in the polyester composition with respect to the weight of the composition lies, preferably, between 5 and 500 ppm with a special preference for between 10 and 250 ppm.

Preferably, the polyester composition in accordance with the invention exhibits a degree of turbidity expressed in "nephelometric turbidity units" (NTU) equal to or less than 12 and, in particular, equal to or less than 8.

Furthermore, a polyester composition in accordance with the invention exhibits a very low level of specific resistance. Preferably, this resistance is at the most $10^8$ Ohm×cm and, in particular, at the most $5 \times 10^7$ Ohm×cm when the specific resistance is determined as part of establishing the melt capability in a stainless steel cell with an accompanying measurement device.

Beyond this, a polyester composition in accordance with the invention exhibits a high thermal resistance. Preferably, the thermo-oxidative stability amounts to at least 30% and more preferably at least 50% when measured by thermographimetric analysis under air at temperatures of up to 300° C.

The polyester compositions in accordance with the invention exhibit, preferably, a very small content of contaminants and, in particular, of acetaldehyde. Preferably the proportion of acetaldehyde amounts to a maximum of 150 ppm, with a greater preference for a maximum of 100 ppm and a still greater preference for a maximum of 50 ppm, with respect to the weight of the composition.

The polyester composition can be processed into granules. Furthermore, the polyester melts obtained directly from the preparation process can be processed into films, for example.

The preparation of films from the polyester composition is also well known and in this context reference is made to, amongst other sources, the Encyclopedia of Polymer Science and Engineering, Vol. 12, 2nd Edition, Pages 195-210 and to U.S. Pat. No. 2,823,421.

To prepare films from polyester compositions it is preferable to use procedures where the polyester is electrostatically charged to increase the adhesion of the polyester to the cooling rolls. Such procedures are state of the art. Preferred variants are described in, amongst other sources, EP-0 707 940 and the previously-cited publication "Improved Electrostatic Pinning Using a Biased, Conductive Shield", Journal of Electrostatics 40 & 41 (1997) 735-740.

It is customary for the polyester composition to be extruded in a molten state through a nozzle onto a roller which can generally exhibit a temperature of between 60 and 80° C. Very often this results in the formation of a film of amorphous polyester. If a melt containing polyethyleneterephthalate is processed, the temperature of the polyester melt is generally between 270 and 310° C.

The degree of crystallinity of the film immediately after leaving the first roller, i.e. before tension is applied to the film, is generally less than 5%, preferably equal to or less than 1% and, in particular, equal to or less than 0.5%.

The thickness of the film which is determined by drawing the polyester melt onto a roller can lie within a wide range of values, the actual value being dependent upon the intended use of the film and determined by the stretching forces which are applied in both the longitudinal and transverse directions. In general, the thickness of the film lies between 3 and 500 μm and preferably, between 6 and 300 μm.

The rotation speed of the roller on to which the polyester melt is fed usually lies between 80 and 140 in/min and preferably between 90 and 120 m/min.

Finally the resulting film can be stretched in the longitudinal direction (i.e. the machine direction). In general, the film is stretched in the longitudinal direction at a temperature of between 75 and 100° C. and, preferably, between 85 and 90° C.

The stretch factor lies, preferably, between 2 and 6 with a special preference for between 3 and 5, this being dependent on whether the stretching operation is a single- or multi-phase activity.

Preferably, the film which is obtained by feeding the polyester melt on to a roller is stretched while travelling at a speed of between 200 and 600 m/min, with special preference for a speed of between 270 and 400 m/min.

Following this step the film exhibits a degree of crystallinity of between 10 and 25% with a particular preference for between 15 and 20%.

The film obtained in this way can be used to produce webs for packaging purposes.

Furthermore, after being stretched longitudinally, the film can be subjected in a further step to transverse stretching, i.e. across the direction of manufacture.

Preferably, the factor by which the film is stretched transversely lies between 2 and 5 and, more preferably, between 3 and 4. In general, the film is stretched transversely at a temperature of between 90 and 120° C., but preferably between 100 and 120° C.

After being stretched transversely, the film exhibits, preferably, a degree of crystallinity of between 20 and 45% and, more preferably, of between 30 and 40%.

The film obtained in this way can be used, amongst other applications, as a packaging material and, in particular, for shrink wrapping purposes.

In addition, the film can also be subjected to a heat stabilisation step so that on heating to temperatures of 150° C. or of 190° C. the film shrinks only very slightly. To achieve this the transversely stretched film is heated to a temperature of between 180 and 220° C. for a few seconds. This causes the degree of crystallinity to increase to about 50%.

The films obtained by the procedures associated with the present invention can be used in all those areas of application in which conventional films are employed. Thus they can be used for packaging purposes—for example, in the food-stuff industry—and in the medical sector, for photography, means of data storage, such as microfilms, magnetic tapes, printing applications such as hot-stamping foils.

In general, the thickness of the films obtained by the present procedure lies between 1 and 350 μm, with the actual thickness being dependent upon the intended application. Thus, the thickness lies between 6 and 250 μm for packaging films, 50 to 175 μm for photographic films, 100 to 200 μm for microfilms, 250 to 350 μm for insulation film for motors and generators while the thickness of films used in the manufacture of capacitors lies in the range of 1 to 5 μm.

The films in accordance with invention, while being thin, preferably exhibit a low rate of faults. The preferred films contain at most 1,100, more preferably, at most 900 faults, and particularly preferred, at most 600 faults larger than 50 μm per sq. meter. These results are also capable of being achieved with thin films which preferably have a thickness of at most 250 μm with special preference for 30 μm.

In what follows the invention is described by way of examples and comparisons without the invention being limited to these examples and comparisons.

The Preparation of Additives 1.1 Preparation of a 10% by Weight Solution of Mg(Ac)$_2$ in Ethyleneglycol (EG)

(magnesium acetate (Mg(Ac)$_2$×4H$_2$O) produced by the Riedel de Haen Co.

This solution cannot be produced in a clear form. Regardless of whether the solution is made hot or cold a milky turbidity always develops. If the Mg-acetate is first dissolved in water (1:2) and then diluted with EG to produce a Mg-acetate content of 10% (at room temperature) the solution remains clear and colourless. If boiled under reflux the solution develops a milky turbidity.

The clear solution of Mg-Acetate in water/ethylene glycol prepared at room temperature is used for further mixing tests with glycolic solutions of selected P-compounds.

1.2 The Preparation of Clear Solutions in EG of the Following P-Compounds in a Respective Concentration of 10% by weight:

phosphoric acid;
carboxyethylphosphonic acid (CEPA) produced by the Rhodia Consumer Specialities Co.
triethylphosphono-acetate (TEPA) produced by the Rhodia Consumer Specialities Co.
tri-ethylphsphono-proprionate (TEPP) produced by the ON-CHEM Co.;
tris-tri-ethyleneglycolphosphate (TEGPA) produced by the Masso Co.

1.3 Addition of the Aqueous/Glycolic Mg(Ac)2-Solution to the Glycolic Solutions of Selected P-Compounds In the following table I the results of the mixing tests are shown for those carried out at room temperature (20° C.) and under reflux conditions (RF):

TABLE I

Mixing Tests

| Phosphoric acid | Mg(Ac)$_2$ Sol., 20° C. Turbidity -> precipitate | Mg(Ac)$_2$ Sol., RF Precipitate |
|---|---|---|
| CEPA | Becomes turbid overnight | Turbid |
| TEPA | Clear | Clear |
| TEPP | Clear | Clear |
| TEGPA | Clear | Turbid |

It can be seen from Table I that neither phosphoric acid nor carboxyethylphosphonic acid (CEPA) is suitable for producing stable mixtures for dosing solutions in the polyester process. Also, the phosphoric acid ester TEGPA, a customary P-stabiliser in the PET-process, leads to turbidity and precipitation with Mg-Acetate. Only the phosphonic acid esters TEPA and TEPP form clear glycolic solutions with Mg-Acetate even under reflux conditions.

Comparison Example 1

To prepare the polyester composition the following equipment was used: a 10-liter laboratory autoclave with a distillation column for the esterification together with a condenser, a cooling trap, and a facility for operating under vacuum for the prepoly- and polycondensation stages.

The equipment was charged with 5.170 g of the esterification product, 200 ppm of Sb (with respect to the polyester) and 30 ppm of phosphorus (in the form of tri-ethylphosphono-acetate made by the Rhodia Consumer Specialities Co. (TEPA). The esterification product was a terephthalate-ethyleneglycol precursor with a conversion rate of 97.40% and a melting point (DSC) of 240.9° C. The antimony was added in the form of antimony tri-acetate in glycolic solution (2% by weight). The TEPA was added as a 10% by weight solution in ethylene glycol.

In the first place, the equipment was rendered inert by nitrogen. Then the mixture was heated to 250° C. The pre-polycondensation and the polycondensation were carried out under a temperature-pressure programme which is set out in Table 2. The condensation was stopped when an intrinsic viscosity of 0.63 dl/g was reached.

TABLE 2

| SEG No. | Time [Minutes] | Product Temperature [° C.] | Pressure [mbar] |
|---|---|---|---|
| 1 | 0 | 250 | 1,000 |
| 2 | 40 | 270 | 1,000 |
| 3 | 50 | 270 | 200 |
| 4 | 75 | 270 | 200 |
| 5 | 80 | 270 | 50 |
| 6 | 100 | 270 | 50 |
| 7 | 105 | 270 | 10 |
| 8 | 110 | 271 | 1 |
| 9 | 200 | 280 | 1 |
| 10 | End | 280 | 1 |

The properties of the resulting polyester compositions were determined according to the following analysis procedures and the data obtained together with the polycondensation time are shown in Table 3.

The intrinsic viscosity (I.V.) of a solution of 500 mg of polyester in 100 ml of a mixture of phenol and 1,2-dichlorobenzene (3:2 parts by weight) was measured at 25° C.

The determination of the di-ethyleneglycol (DEG) in the polyester was made by gas chromatography after prior methanolysis of 1 g of polyester in 30 ml of methanol with the addition of 50 mh/liter of zinc acetate in the bomb tube at 200° C.

The concentration of the COOH-endgroups was determined by photometric titration with 0.05 n ethanolic potassium hydroxide solution using bromo-thymol blue of a solution of a polyester in a mixture of o-cresol and chloroform, (70:30 parts by weight).

The measurement of the colour values L and b was made by the Hunter technique where $$L = 10 \cdot \sqrt{Y} \text{ and}$$

$$b = \frac{7.0}{\sqrt{Y}} \cdot (Y - 0.8467 \cdot Z)$$

The polyester chips were first crystallised in the drying cabinet at 135+/−5° C. for a period of one hour. The colour values were then determined in a three-AREA colour measurement device in the course of which the colour tones (X-, Y- and Z-values) of the polyester sample were assessed with three photo-cells each faced with a red-, green- and blue colour filter. The evaluation was carried out using the Hunter formula.

The acetaldehyde was driven off from the polyester by heating in a sealed vessel after which the content of the acetaldehyde in the gas-occupied space of the vessel was determined by a gas chromatography technique involving head space analysis (gas chromatograph with FID and head-space injection system HS40, Perkin Elmer; the carrier gas was nitrogen; the column 1.5 m stainless steel, the packing material: PorapackQ, 80-100 mesh; the sample quantity was 2 g, the heating temperature: 160° C., the duration of heating: 90 min.)

The measurement of the degree of turbidity in "nephelometric turbidity units" (NTU) was made on a 10% by weight solution of polyester in phenol/1,2-dichlorobenzene (3:2 parts by weight) using a nephelometer made by the Hach Co. Type XR, as per U.S. Pat. No. 4,198,161) in a cuvette having a diameter of 22.2 mm in an analogous manner to that described in DIN-standard 38404, Part 2, used for water. The intensity of the scattered light is measured and compared with a formazine standard solution after deducting the value for the solvent (about 0.3 NTU).

The measurement of the glass point, the crystallisation point and the melting point were carried out as follows:
7-9 mg of the polyester sample were heated for 1 minute at 310° C. in an aluminium crucible in a differential scanning calorimeter (DSC) and under an atmosphere of nitrogen; the sample was cooled on an aluminium plate and the oven temperature reduced to 35° C. The cooled sample was heated in successive stages of 10K/minute up to 300° C. and in the course of this procedure, the glass transition temperature Tg, the crystallisation temperature Tk and the melting point Tm were measured.

The filter test was carried out as follows:
2-3 kg of pre-dried polyester material were passed through a laboratory extruder with pressure-dependent speed control at temperatures of 290° C. and through a filter having a nominal mesh size of 15 μm and the rise in pressure at the filter was determined over a period of 60 minutes.

The filter value Fw is calculated from the following formula:

$$Fw = A \times (Pe - Pb)/M [bar \times cm^2/kg]$$

Pe—pressure in bar at the end of the test
Pb—pressure in bar at the beginning of the test
M—the amount of polymer processed in kg
A—the area of the filter surface in $cm^2$ Determination of the visible faults in the film:
The polymer is melted in a laboratory extruder. A thick film is extruded through a flat nozzle which is processed to a film with the help of a tempered cooling roller. This is passed through an optical inspection system in which the film faults are determined by a special digital high-speed line sensor equipped with an image processing computer (FS 5 made by the Optical Control Systems GmbH, OCS). The evaluation of the determined faults is carried out by assigning the impulses to specific magnitude and type-classes. The outcome was expressed as the average number of the visible faults greater than 50 μm/$m^2$.

The conductivity of the polyester is determined with a specially-developed stainless-steel cell with electrodes and an attached measurement facility with a digital display of the measured values. The procedure involves heating the polymer sample in stages of 10K/minute to 270° C. and then, after a steady state time of 10 minutes, in further stages of 10 K/minute up to 300° C. The conductivity is measured in μS/min and converted using the individual cell constant to Ω·cm.

Example 1

Example 1 was carried out in an equivalent manner to Comparison Example 1 except that no antimony and no TEPA were added. Instead, 22.8 g of an aqueous, glycolic solution which contained 10% by weight of magnesium acetate, the magnesium acetate having been previously dissolved in water (1:2) and then mixed with ethylene glycol (compare with the preparation of additives, TEPA) were added. Then 11.9 g of a glycolic solution of tri-ethylphosphono-proprionate, which contained 10% by weight of tri-ethylphosphonoproprionate (TEPP) made by ON-Chem Co. were added.

In a corresponding manner 50 ppm of magnesium and 30 ppm of phosphorus (each with respect to the polyester precursor) were added to the polyester precursor.

The polyester composition obtained by the polycondensation was analysed according to the procedure described above.

The resulting data are set out in Table 3.

Comparison Example 2

Comparison Example 2 was carried out in an equivalent manner to that used for Example 1 except that no addition of TEPP was made. Instead, there was added 19 g of a glycolic solution containing 10% by weight of tris-tri-ethyleneglycol-phosphate (TEGPA) made by the Masso Co. To the polyester precursor was added in a similar manner 50 ppm of magnesium and 30 ppm of phosphorus, each with respect to the precursor stage.

The polyester composition obtained by the polycondensation was analysed according to the procedure described above.

The resulting data are set out in Table 3.

Comparison Example 3

Comparison example 3 was carried out in an equivalent manner to that used for the comparison example 2 except that no addition of TEGPA was made. Instead, there was added 4.9 g of a glycolic solution containing 10% by weight of phosphoric acid. To the polyester precursor was added in a similar manner 50 ppm of magnesium and 30 ppm of phosphorus, each with respect to the precursor stage.

The polyester composition obtained by the polycondensation was analysed according to the procedure described above.

The resulting data are set out in Table 3.

Example 2

Example 2 was carried out in an equivalent manner to Example 1 except that 200 ppm of antimony with respect to the polyester were added. The antimony was added in the form of antimony tri-acetate in glycolic solution (2% by weight). In a corresponding manner 50 ppm of magnesium and 30 ppm of phosphorus (each with respect to the polyester precursor) were added to the polyester precursor.

The polyester composition obtained by the polycondensation was analysed according to the procedure described above.

The resulting data are set out in Table 3.

Example 3

Example 3 was carried out in an equivalent manner to that used for Example 2 except that no addition of TEPP was made. Instead, there was added 11.2 g of a glycolic solution of tri-ethylphosphono-acetate containing 10% by weight of TEPA. To the polyester precursor was added in a similar manner 50 ppm of magnesium and 30 ppm of phosphorus, each with respect to the precursor stage.

The polyester composition obtained by the polycondensation was analysed according to the procedure described above.

The resulting data are set out in Table 3.

Example 4

Example 4 was carried out in an equivalent manner to that used for Example 3 except that 100 ppm of magnesium and 60 ppm of phosphorus, each with respect to the precursor stage were added.

The polyester composition obtained by the polycondensation was analysed according to the procedure described above.

The resulting data are set out in Table 3.

Example 5

Example 5 was carried out in an equivalent miner to that used for Example 3 except that, additionally, 125 ppm of penta-erythritol were added.

The polyester composition obtained by the polycondensation was analysed according to the procedure described above.

The resulting data are set out in Table 3.

The data obtained show that polyester compositions in accordance with the invention exhibit a high level of conductivity together with a low degree of turbidity. Furthermore there are advantages in respect of the filter test. Surprisingly the advantages deriving from the invention could be increased by the addition of branching agents. Thus it was possible to reduce the polymerisation time and the level of turbidity.

The polyesters prepared in this manner were processed in a film-making plant with a twin screw extruder BT-55-33d, a BEMATEC 100 μm filter, a EDI PET nozzle, wire-pinning (0.12 mm) with an auxiliary winder to produce a film. The draw-off speeds were increased in steps of 10 from 40 to 110 m/min.

The materials cited in Examples 2-5 were tested against the material used for Comparison Example 1. In that instance, it was possible to increase the draw-off speed for the polyester in accordance with the invention by 25-30%. nozzle, wire-pinning (0.12 mm) with an auxiliary winder to produce a film. The draw-off speeds were increased in steps of 10 from 40 to 110 m/min.

The materials cited in Examples 2-5 were tested against the material used for Comparison Example 1. In that instance, it was possible to increase the draw-off speed for the polyester in accordance with the invention by 25-30%.

TABLE 3

| | Unit | Comp. Example 1 | Example 1 | Comp. Example 2 | Comp. Example 3 | Example 2 | Example 3 | Example 4 | Example 5 |
|---|---|---|---|---|---|---|---|---|---|
| Additives | | | | | | | | | |
| Sb from SbAc3 | ppm | 200 | — | — | — | 200 | 200 | 200 | 200 |
| Pentaerythritol | ppm | — | — | — | — | — | — | — | 125 |
| Mg from Mg-Acetate | ppm | — | 50 | 50 | 50 | 50 | 50 | 100 | 50 |
| P from phosphoric acid | ppm | — | — | — | 30 | — | — | — | — |
| P from TEPA | ppm | 30 | — | — | — | — | 30 | 60 | 30 |
| P from TEPP | ppm | — | 30 | — | — | 30 | — | — | — |
| P from TEGPA | ppm | — | — | 30 | — | — | — | — | — |
| Analyses | | | | | | | | | |
| Polymerisation period | Minutes | 175 | 206 | 215 | 232 | 151 | 146 | 117 | 129 |
| Viscosity | dl/g | 0.62 | 0.627 | 0.63 | 0.597 | 0.615 | 0.619 | 0.599 | 0.619 |
| Di-ethyleneglycol | % by weight | 1.56 | 1.71 | 1.73 | 2.01 | 1.69 | 1.76 | 1.73 | 1.72 |
| —COOH End-groups | mmol/kg | 14/14 | 39/41 | 37/38 | 43/46 | 24/25 | 25/26 | 26/27 | 24/26 |
| L, chips cryst. | — | 73.8 | 81.6 | 85.7 | 79.7 | 74.1 | 73.6 | 74.6 | 74.2 |
| a chips cryst. | — | −1 | −1.8 | −2.2 | −2.0 | −1.2 | −0.4 | −1.3 | −1.0 |
| b chips cryst. | — | −0.5 | 4.9 | 5.5 | 6.3 | 0.5 | 0.5 | −0.1 | 0.8 |
| Acetaldehyde | ppm | 81 | 79 | 86 | 107 | 88 | 85 | 86 | — |
| Turbidity | NTU | 5.5 | 3.2 | 11.2 | 28.9 | 9.9 | 7.3 | 7.8 | 5.0 |
| Glass point | °C. | 79.1 | 78.3 | 79 | 78.2 | 78.3 | 78.2 | 78.4 | 78.3 |
| Crystallisation point | °C. | 135.9 | 135.2 | 134.1 | 133.4 | 137.2 | 137.3 | 137.1 | 136.9 |
| Melting point | °C. | 254 | 253.3 | 252.3 | 253.0 | 254.2 | 253.2 | 253.0 | 254.1 |
| Filter test | bar*cm$^2$/kg | 3.4 | 12.1 | 8.9 | 237 | 11.2 | 2.1 | 2.3 | 4.2 |
| Faults > 50 μm | 1/m$^2$ | 479 | 1042 | 941 | 13562 | 883 | 379 | 435 | 530 |
| Conductivity | 10$^7$Ω* cm | 90 | 9.6 | 13.8 | 65 | 6.0 | 4.5 | 4.0 | 4.5 |

The invention claimed is:

1. In a method for the manufacture of a polyester composition comprising the steps of:
   A) producing a dicarboxylic acid dialkylester by reaction of an alkanediol with a dicarboxy acid or a dicarboxy acid ester;
   B) pre-polycondensation of said dicarboxylic acid dialkylester to form pre-polycondensates;
   C) melt polycondensation of said pre-polycondensates to form polyester;

the improvement comprising including a low-turbidity solution during said melt polycondensation, said solution comprising at least one alkali- and/or alkaline-earth metal salt, and at least one composition comprising at least one phosphonic acid ester of the Formula (I)

$$(RO)OC-R'-PO(OR)_2 \qquad (1)$$

wherein each R independently is a group with 1 to 60 carbon atoms and R' is a binding group with 1 to 20 carbon atoms, said low-turbidity solution being prepared by (i) dissolving said at least one alkali and/or alkaline-earth metal salt in water, (ii) then adding thereto at least one organic solvent, and (iii) then adding thereto a composition comprising at least one phosphonic acid ester of the Formula (I) and an organic solvent, wherein said low-turbidity solution exhibits a turbidity level equal to or less than 8 NTU and wherein the amount of at least one alkali- or alkaline-earth metal in said alkali or alkaline earth metal salt lies between 10 and 500 ppm with respect to the weight of the dicarboxylic acid dialkylester.

2. The method according to claim 1, wherein each R in Formula (I) independently is an alkylene- or an aryl group with 1 to 20 carbon atoms.

3. The method according to claim 1, wherein R' in Formula (I) is an alkylene- or aryl group with 1 to 8 carbon atoms.

4. The method according to claim 1, wherein the at least one phosphonic acid ester is selected from the group consisting of triethylphosphono-acetate, tri-methylphosphono-acetate, and tri-methylphosphono-proprionate.

5. The method in accordance claim 1, wherein the polyester precursor is suitable for the manufacture of polyethylene-terephthalate and/or polytri-methylene-terephthalate.

6. The method in accordance with claim 1, wherein the composition contains at least one branching agent.

7. The method in accordance with claim 1, wherein the metal salt is a magnesium, lithium, sodium, potassium, calcium, or barium salt.

8. The method according to claim 1, wherein the amount of the at least one phosphonic acid ester having the Formula (I) lies between 10 and 500 ppm with respect to the weight of the dicarboxylic acid dialkylester.

9. The method according to claim 1, wherein the molar ratio of alkali- and/or alkaline-earth metal salt to phosphonic acid ester lies between 1:0.1-1:2.0.

10. The method according to claim 1, wherein the organic solvent is ethylene glycol.

11. A polyester composition obtained by the method of claim 1.

12. A film consisting essentially of at least one polymer composition according to claim 11.

13. The film according to claim 12, wherein the film possesses a specific resistance of equal to or less than $10^8$ $\Omega$*cm.

14. The film according to claim 12, wherein the film possesses a thickness of between 1 μm and 350 μm.

15. The film according to claim 12, wherein the film contains no more than a maximum of 900 faults per square meter greater than 50 μm.

* * * * *